United States Patent [19]

Sweet

[11] Patent Number: 5,032,822
[45] Date of Patent: Jul. 16, 1991

[54] TIRE DEFLATION WARNING SYSTEM

[76] Inventor: Bill J. Sweet, 758 Jimae Ct., Independence, Ky. 41051

[21] Appl. No.: 639,817

[22] Filed: Jan. 9, 1991

[51] Int. Cl.[5] .............................................. B60C 23/08
[52] U.S. Cl. .................................. 340/443; 200/61.24
[58] Field of Search .............................. 340/443, 442; 200/61.24, 61.44, 52 A

[56] References Cited
U.S. PATENT DOCUMENTS 1,638,983  8/1927  Crone ............................. 340/443 X
2,091,101  8/1937  Moss .................................... 340/443

Primary Examiner—Joseph A. Orsino
Assistant Examiner—Brian R. Tumm
Attorney, Agent, or Firm—Norman B. Rainer

[57] ABSTRACT

A tire deflation monitoring system utilizes a device which attaches to the undercarriage of a vehicle adjacent each pneumatically inflated tire which is to be monitored. The device employs a component such as a wheel for rotationally contacting the road surface upon which the vehicle is disposed. When the road surface is contacted, the wheel is forced upwardly, causing contact to be made with an electrical switch that activates an indicator located in the driver's compartment of the vehicle.

6 Claims, 3 Drawing Sheets

TIRE DEFLATION WARNING SYSTEM

BACKGROUND OF THE INVENTION

1. Field of the Invention

This invention relates generally to signal means and more particularly to signal means adapted to be attached to a motor vehicle for indicating a low pressure condition of ground-engaging pneumatic tires.

2. Description of the Prior Art

In recent years the use of tubeless tires has become more prevalent. Although tubeless tires are superior to former tube-type tires in many respects, it has been found that they often develop slow leaks. The slow leaks result from many reasons. Perhaps the most frequent reason is deformation of the wheel rim. This causes the seal between the tire and the rim to become less than perfect, and permits air to leak from the tire. Various forms of vehicles equipped with pneumatic tires can be operated with one of the pneumatic tires thereof in a deflated position without the driver of the vehicles being aware of the deflated tire condition.

It is advisable to maintain proper air pressure in the tires for the purpose of assuring proper vehicle riding qualities, for preventing rapid tire wear and for eliminating the safety hazard presented by improper inflation. Furthermore, operation of a deflated tire for more than short distances causes the tire to be excessively flexed and to generate heat. This excessive flexing and heat can quickly render the tire irreparably damaged. Accordingly, a need exists for a low tire pressure warning system which may be readily mounted on various forms of vehicles and utilized to indicate to the driver when one of the pneumatic tires thereof or the pneumatic tires of a towed trailer has become deflated.

Various forms of low tire pressure warning systems have been heretofore designed, but most of these systems are not constructed in a manner whereby they may be readily mounted upon various vehicles equipped with different types and sizes of axles.

Furthermore, the prior systems do not incorporate features to prevent damage to the warning system components themselves in event of a rapid tire deflation or a slow leak of the tire while the vehicle is left unattended. Earlier devices typically depend upon a switch lever or feeler which makes contact with the ground to indicate a low tire pressure. However, the switch activation lever or feeler may become bent, or be abraded off by contacting the road at high speeds. Another shortcoming of earlier devices is that a slow deflation while unattended causes direct compressive force to be exerted upon the switching means upon vertical contact with the road surface. Consequent damage to the switch means may be more costly than the mere deflation of the tire, and the activation lever or feeler would need to be repaired or replaced in order to render the device once again useful for its intended purpose.

Examples of various forms of previous low tire pressure warning systems are disclosed in U.S. Pat. Nos. 2,258,334, 2,469,931, 2,640,119, 2,740,007 and 3,610,851.

The main object of this invention is to provide a low tire pressure warning system including visual and audible signal generators actuatable in response to the sensing of low tire pressure.

A further object of the present invention is to provide a low tire pressure warning system which may be utilized on operator driven vehicles as well as on vehicles trailed behind operator driven vehicles.

It is a still further object of this invention to provide a system in accordance with the preceding objects readily adapted for use on vehicles having different size tires.

Yet another object of the present invention is to provide a low tire pressure warning system of the aforesaid nature resistant to damage caused by contacting the road surface in the event of a tire pressure leak, and which may be easily installed onto various forms of vehicles after their manufacture.

An additional object of this invention is to provide a low tire pressure warning system of the aforesaid nature of simple, durable construction amenable to low cost manufacture.

These objects and other objects and advantages of the invention will be apparent from the following description.

SUMMARY OF THE INVENTION

The above and other beneficial objects of the present invention are accomplished in accordance with the present invention by an improved tire deflation detection system adapted for use in association with a vehicle having a battery, driver's compartment, and at least one pair of pneumatically inflated tires, each tire having a central hub adapted to be maintained at a fixed distance from the underlying road surface when said tire is inflated to its standard pressure, and rotatably associated in stationary relationship with a fixed support member of said vehicle, said system comprised of:

(a) a mounting assembly adapted to engage said support member, and having a fixed horizontal arm and a spacer downwardly emergent from said horizontal arm and terminating in a lower extremity, (b) an activation lever disposed below said horizontal arm and having a proximal extremity pivotably associated with the lower extremity of said spacer, and a free distal extremity, said lever being constrained to pivotable travel in a vertical arc, (c) a vertically disposed post slidably associated with said distal extremity and having a bottom extremity equipped with means for rotationally contacting said road surface, (d) a first coil spring acting compressively to urge said post downwardly, (e) a second coil spring acting under tension to urge said lever downwardly, (f) electrical switch means associated with said horizontal arm and having a contact extremity downwardly directed toward said lever, (g) first stopping means for halting upward movement of said lever, (h) second stopping means for halting downward movement of said post, and (i) indicator means positioned in said driver's compartment and electrically activatable by said battery when said lever places upward force against the contact extremity of said switch means.

In a preferred embodiment, the system is applied to the axle housing associated with the rear wheels of a vehicle, and additionally applied to the lower control arm conventionally adjacent each front wheel. Each unit is wired to separate adjacent indicators in the driver's compartment. The indicator means may be in the form of visual lights and/or audible sounding devices.

A pedestal of threadably adjustable height may be positioned upon the activation lever in a manner to controllably vary the amount of required upward movement of the activation lever for meeting the contact extremity of the switch.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
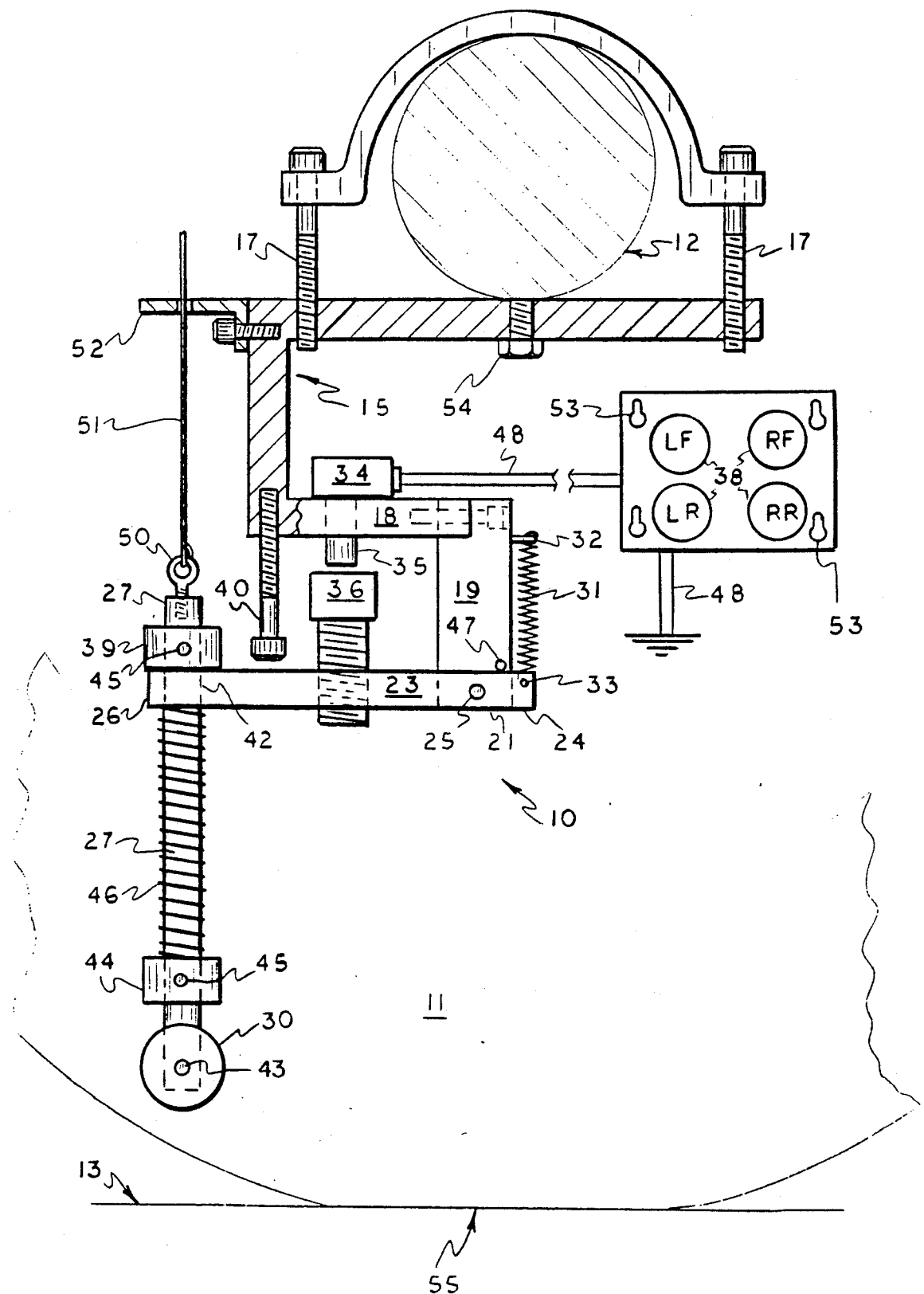
FIG. 1 is a side view of an embodiment of the system of the present invention, with portions shown schematically.
Figure 2:
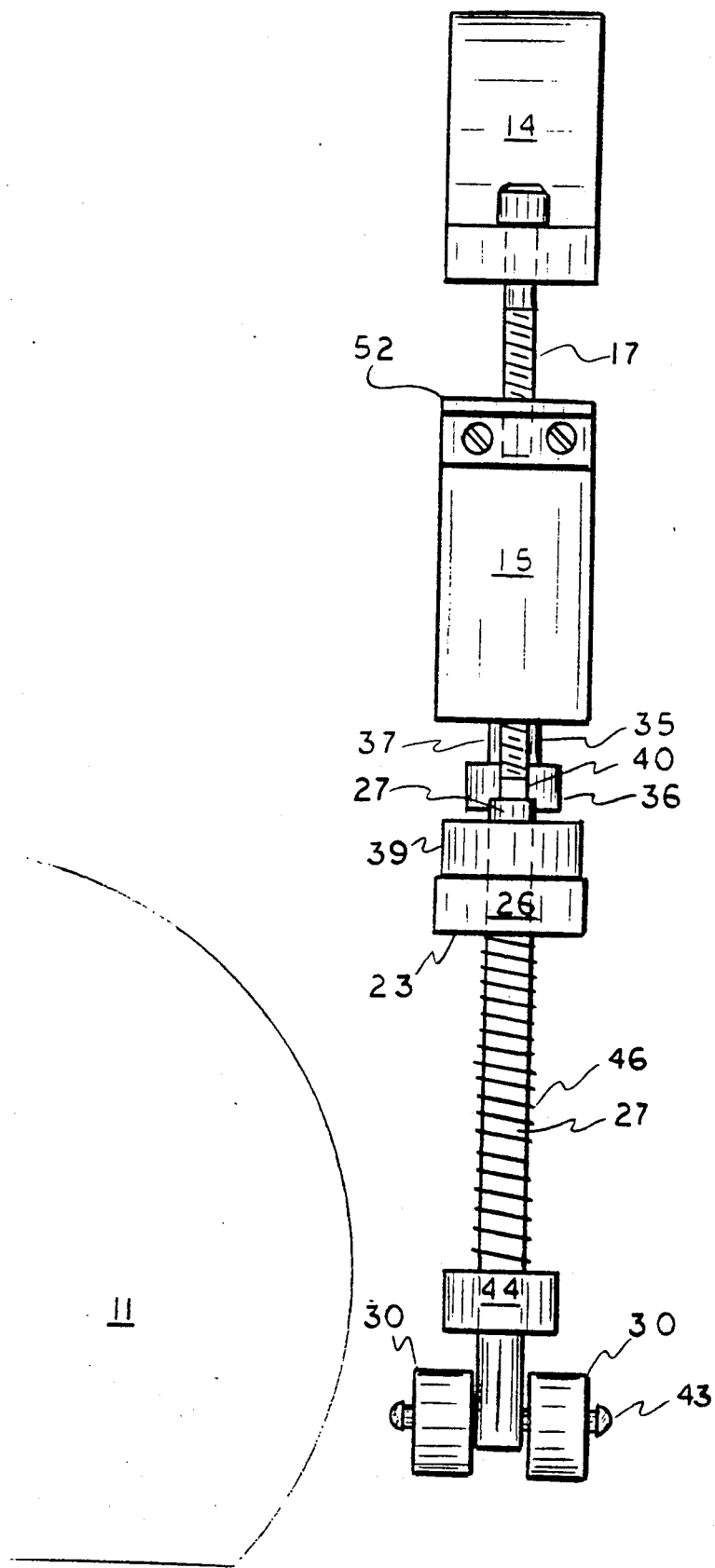
FIG. 2 is a rear view of the embodiment of FIG. 1, viewed from the left side of FIG. 1.
Figure 3:
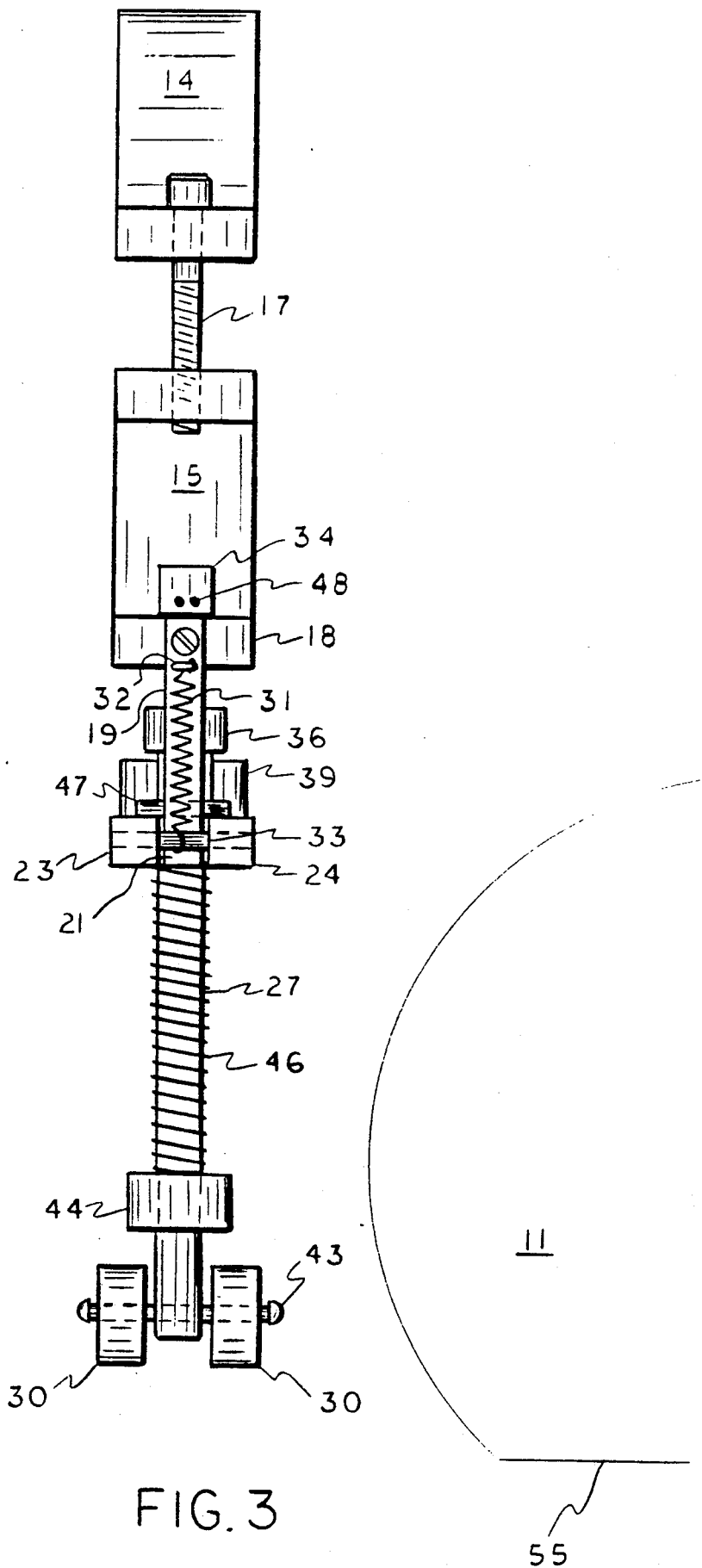
FIG. 3 is a front view of the embodiment of FIG. 1.

Referring to FIGS. 1-3, an embodiment of the system 10 of the present invention is shown attached to a fixed support such as axle housing 12 of an automobile and closely adjacent the "footprint" region 55 of a normally inflated tire 11 riding upon an underlying road surface 13.

The system 10 is comprised of a mounting assembly having saddle clamp 14 held by threaded bolts 17 to bracket 15 having a fixed horizontal arm 18 and a spacer bar 19 downwardly emergent from said horizontal arm and terminating in lower extremity 21. A set screw 54, interactive with bracket 15, may be employed to augment the securing effect of clamp 14. Bracket 15, horizontal arm 18 and spacer bar 19 may be integral components of a single monolithic structure.

An activation lever 23, disposed below said horizontal arm, has a bifurcated proximal extremity 24 that embraces the lower extremity of spacer bar 19. Horizontally disposed pivot pin 25 penetratively secures said spacer bar to said proximal extremity. The free distal extermity 26 of lever 23 is accordingly constrained to controlled pivotable movement in a vertical arc.

A vertically disposed post 27 is slidably retained by a close-fitting channel 42 vertically disposed in lever 23 adjacent its distal extremity 26. The bottom extremity of post 27 is equipped with paired wheels 30 adapted to rotate in vertical planes about attachement axle 43. Said wheels are adapted to contact the pavement when the tire sinks by virtue of inadvertent deflation. In other embodiments, alternative means such as caster wheels or a ball bearing may be employed to rotatively contact the pavement. Post 27 and channel 42 are preferably of non-round cross-section to prevent rotation of said post about its vertical axis.

Upper and lower retention collars 39 and 44 respectively, are adjustably affixed by set screws 45 to post 27 adjacent the upper and lower extremities thereof. Collar 39 resets in abutment with the upper surface of lever 23. A first coil spring 46 is positioned upon post 27, its upper extremity abutting against the lower surface of lever 23, and its lower extremity abutting against collar 44. Said coil spring 46 acts compressively to urge post 27 downwardly.

A second coil spring 31 extends between engagement hook 32 on spacer bar 19 and engagement pin 33 spanning the bifurcated proximal extremity 24 of lever 23. Said second spring 31 acts under tension to urge distal extremity 26 downwardly. The force of spring 31 is less than the force of spring 46.

A first stopping means in the form of bolt 40, threadably pendant from horizontal arm 18, halts upward movement of lever 23. A second stopping means, in the form of abutment pin 47 which transversely penetrates spacer bar 19, limits the downward movement of distal extremity 26, causing lever 23 to be biased to a horizontal position.

Electrical switch 34, preferably of the normally open momentary SPST type, is attached to horizontal arm 18. A spring-loaded contact extremity 35 extends from switch 34 downwardly through arm 18 toward lever 23. A threadably adjustable pedestal 36 is disposed upwardly from lever 23 in centered alignment with contact extremity 35. The spacing between the pedestal and contact extremity 35 is adjusted to be slightly smaller than the spacing between bolt 40 and lever 23. Such relationship enables switch 34 to be activated by slight upward movement of lever 23, but bolt 40 prevents excessive upward movement of lever 23 which would damage contact extremity 35. Retaining means may be employed to maintain wheels 30 in an upper, inactive position, as when it is desired not to use the device of this invention. Said restraining means may be comprised of an eye 50 positioned upon post 27 and adapted to anchor the extremity of a cable 51 that travels through guide bracket 52 and thence to the driver's compartment where is can be pulled or pushed in the manner of a choke control button.

Electrically activated indicator lights 38 are located in the driver's compartment of the vehicle, and are wired by conductors 48 to ground and to the battery through switch 34, and are adapted to indicate positively upon closure of switch 34. On-off toggle switches 53 may be associated with each light. In alternative embodiments, the audible alarm may be used in conjunction with the indicator lights. In most embodiments, the system interacts with the axle housing adjacent each rear wheel of the vehicle, and further interacts with the lower control arm adjacent each front wheel. The system is wired to provide separate adjacent indicator lights for each tire in the driver's compartment. When tire 11 is deflated, the vertical distance between road surface 13 and axle housing 12 is reduced, causing contact of the road surface with wheels 30. Post 27 and free extremity 26 are moved upward with respect to spacer 19, and pedestal 36 contacts activator means 35, thereby completing an electrical circuit between the battery and indicator light 38. The light corresponding to the particular deflating tire, whether left front (LF), left rear (LR), or right front (RF) or right rear (RR) is thereby illuminated.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A tire deflation detection system adapted for use in association with a vehicle having a battery, driver's compartment, and at least one pair of pneumatically inflated tires, each tire having a central hub adapted to be maintained at a fixed distance from the underlying road surface when said tire is inflated to its standard pressure, and rotatably associated in stationary relationship with a fixed support member of said vehicle, said system comprised of:

(a) a mounting assembly adapted to engage said support member, and having a fixed horizontal arm and a spacer downwardly emergent from said horizontal arm and terminating in a lower extremity,
(b) an activation lever disposed below said horizontal arm and having a proximal extremity pivotably associated with the lower extremity of said spacer, and a free distal extremity, said lever being constrained to pivotable travel in a vertical arc,
(c) a vertically disposed post slidabbly associated with said distal extremity and having a bottom extremity equipped with means for rotationally contacting said road surface,
(d) a first coil spring acting compressively to urge said post downwardly,
(e) a second coil spring acting under tension to urge said lever downwardly,
(f) electrical switch means associated with said horizontal arm and having a contact extremity downwardly directed toward said lever,
(g) first stopping means for halting upward movement of said lever,
(h) second stopping means for halting downward movement of said post, and
(i) inidcator means positioned in said driver's compartment and electrically activatable by said battery when said lever places upward force against the contact extremity of said switch means.

2. The system of claim 1 wherein said post has a non-round cross-section which prevents axial rotation.

3. The system of claim 1 further provided with restraining means which enable said post to be raised to an upper position which inactivates the system.

4. The system of claim 1 wherein said second spring exerts less force than said first spring.

5. The system of claim 1 wherein the contact extremity of said switch means is spring-urged toward said lever.

6. The system of claim 1 further comprising threadably adjustable means disposed upwardly from said lever in alignment with said contact extremity.

* * * * *